US006549817B1

(12) United States Patent
Audibert

(10) Patent No.: US 6,549,817 B1
(45) Date of Patent: Apr. 15, 2003

(54) METHOD FOR REGULATING CENTRIFUGES FOR DEHYDRATING WASTEWATER SLUDGE, USING FUZZY LOGIC

(75) Inventor: Jacques Audibert, Cormeilles en Parisis (FR)

(73) Assignee: Degremont, Rueil Malmaison (FR)

( * ) Notice: Subject to any disclaimer, the term of this patent is extended or adjusted under 35 U.S.C. 154(b) by 0 days.

(21) Appl. No.: 09/555,571

(22) PCT Filed: Nov. 3, 1998

(86) PCT No.: PCT/FR98/02349

§ 371 (c)(1),
(2), (4) Date: Jul. 19, 2000

(87) PCT Pub. No.: WO99/28040

PCT Pub. Date: Jun. 10, 1999

(30) Foreign Application Priority Data

Dec. 2, 1997 (FR) ........................................... 97 15166

(51) Int. Cl.[7] ............................................... G05B 13/02

(52) U.S. Cl. ............................ 700/50; 700/46; 700/49; 700/51; 700/52; 700/73; 700/170; 494/37; 494/26; 494/53; 494/57; 494/73; 494/10; 208/13; 208/45; 208/390; 208/424; 208/425

(58) Field of Search ............................ 700/33, 45, 46, 700/50, 49, 51, 52, 53, 73, 74, 160, 170, 173, 174; 494/37, 53–57, 26, 10, 73; 208/13, 425, 45, 390, 424

(56) References Cited

U.S. PATENT DOCUMENTS 4,316,331 A * 2/1982 Lindstrom et al. ......... 159/47.1
4,581,009 A * 4/1986 Kramer ....................... 494/32
5,282,780 A * 2/1994 Epper et al. ................... 494/1
5,405,537 A * 4/1995 Goff et al. .................. 110/188
5,426,866 A * 6/1995 Rumocki .................... 210/609
5,586,966 A * 12/1996 Wood .......................... 494/37
5,902,487 A * 5/1999 Pickering et al. ........... 210/143
6,030,538 A * 2/2000 Held .......................... 205/751
6,059,971 A * 5/2000 Vit et al. .................... 210/174
6,143,183 A * 11/2000 Wardwell et al. ........... 210/143

FOREIGN PATENT DOCUMENTS

DE 2819399 11/1978
DE 3022148 1/1981
WO WO 97/20634 6/1997

OTHER PUBLICATIONS

US 2002/0032111 A1; Publication Date Mar. 14, 2002; Cornay et al.; Concentric Tubular Centrifuge.*

* cited by examiner

*Primary Examiner*—Ramesh Patel
(74) *Attorney, Agent, or Firm*—Connolly Bove Lodge & Hutz LLP

(57) ABSTRACT

A process for regulating a centrifuge used for solid/liquid separation of sewage sludge commences by measuring the input variables of the operating point ot the centrifuge, the variables including 1) suspended matter content of the centrate; 2) the flow rate of sludge; 3) the flow rate of reagent; and 4) the value of torque of the motor of a conventional centrifuge. Operating zones are established, each of which is two dimensional relative to the input variables. Fuzzy logic rules are established, qualifying the operation of the centrifuge, the rules respectively corresponding to the zones. The rules are implemented in response to the input variable measurements, where actions on the sludge flow rate and reagent flow rate make it possible to bring the operating point into a particular zone of optimal and stable centrifuge operation.

5 Claims, 1 Drawing Sheet

Figure 1:
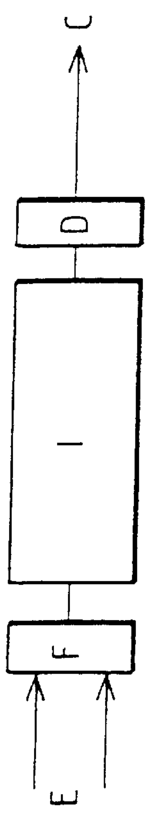

METHOD FOR REGULATING CENTRIFUGES FOR DEHYDRATING WASTEWATER SLUDGE, USING FUZZY LOGIC

The present invention relates to a process for regulating centrifuges which are used for solid/liquid separation in particular for the dewatering of sludges.

It is known that the purpose of a centrifuge, in its application to the dewatering of sludges, is to ensure solid/ liquid separation of the incoming effluent (or sludge) so as to obtain:

on the one hand a cake or sediment of pasty consistency;

on the other hand, a liquid laden with little suspended matter (SM).

In order to facilitate good separation between the solid phase and the liquid phase, and to promote the capture of the solid particles by the centrifuge, a reagent (polymer) is added to the sludge.

The conventional techniques for dewatering by centrifuging are not generally optimal with regard to the following four criteria:

the stability of operation of the centrifuge;

the solids content of the filter cake;

the permanent control of the capture rate and, the dosing of the polymer.

Experience shows therefore that the implementation of centrifuges requires regulation so as to maintain the centrifuge in the best operating zone despite the variations in concentration and in quality of the incoming sludge, whilst optimizing the dose of reagent injected and minimizing the quantity of suspended matter which is not picked up by the centrifuge and which is found in the centrate.

When designing the plant, it will also be necessary to choose between conventional centrifuges and so-called "intensive" centrifuges with a high degree of fill of dry solid matter.

The conventional regulating processes involve measuring the concentration of suspended matter and they may comprise:

1) regulation of the mass flux entering the centrifuge through measurement of the concentration and of the hydraulic discharge acting on the discharge from the booster pump. The main problem to be solved is the reliability of the in-line SM sensor depending on the type of sludge: the response of this sensor is limited in terms of concentration influenced by strong colouring agents and disturbed by tows. These limits reduce the field of application of this regulation to a few particular cases, all the more so since the said regulation cannot take into account variations in quality of sludges as a function of their origins and of their relative proportions (fresh sludges, primary settled sludges, digested sludges etc).
2) Feedback control of the dose of reagent proportionally to the flux entering the centrifuge whether or not the regulation of the mass flux is operational. It is thus possible to envisage more economical management of the polymer dosing.
3) Feedback control of the dose of reagent to the hydraulic discharge entering the centrifuge. This is a particular case of the feedback control mentioned in paragraph 2 above which regards the concentration of the incoming effluent as being "constant". In fact, there must be an excess dosage of reagent so as to offset the inevitable variations in concentration.
4) Regulation of the dose of reagent based on measuring turbidity in the clarified effluent (centrate) by implementing an in-line SM concentration sensor on the drive. The objective of this measurement is to influence the coefficient of proportionality to the reagent dosage flow rate by way of a regulator. In fact, the centrate is not well suited to in-line SM concentration measurement, the latter being disturbed in particular by formations of foams, microbubbles, etc.

Thus for example, WO 97/20 634 describes a process as well as a device for operating and controlling a continuous-feed centrifuge which consist in measuring in real-time in particular the flow rate of sludges and/or of reagents, the suspended matter content, the value of the torque of the centrifuge so as to adjust in particular the flow rate of sludges entering the centrifuge.

Experience shows that these conventional modes of regulation (or the absence of regulation) induce critical and unstable operation of centrifuges, with regard to target values, thus demanding the presence of staff in order to make adjustments and obtain correct operational performance. It will be recalled that this performance is essentially characterized by:

satisfactory solids content of the outgoing sludge;

clarified effluent (centrate) which is sufficiently clear;

a reasonable dose of reagent (polymer).

The purpose of the present invention is to guarantee the abovementioned performance without employing monitoring staff, that is to say to obtain the following characteristics automatically:

optimal solids content of the outgoing sludge without excess polymer;

optimal mass flux irrespective of the variations in the concentration of the sludge entering the centrifuge and, optimally clarified effluent (with no return of pollution to the head of the sewage station).

The applicant is moreover the proprietor of FR-A-2 707 758 which relates to a device for continuously measuring the concentration of suspended matter of a centrate, this device making it possible to carry out a reliable and continuous measurement of the suspended matter content of the liquid phase, the so-called "centrate".

The present invention is characterized by the fact that the regulating of the centrifuge is carried out via fuzzy logic using the signal from the sensor according to FR-A-2 707 758 as well as the other signals available on the centrifuge, thereby making it possible to control the flow rates of sludge and of reagent supplied to the said centrifuge.

A simplified explanation of fuzzy logic will be given hereinbelow.

Referring to FIG. 1 of the appended drawing, the structure of a fuzzy controller can be represented in the form of the diagram of this FIG. 1 in which:

E are the analogue inputs of the system,

C are the system controls,

F represents the transforming of the inputs E into fuzzy variables ("fuzzification")

I is the reasoning module applied to the fuzzy variables (inference rules) and,

D is the calculation of the control C to be applied on the basis of the fuzzy descriptions of the output variables ("defuzzification").

The fuzzy variables are sets of values assigned a degree of membership in a family or a set of families. Thus, the transformation of an analogue input can be decomposed into a multitude of variables, or for simplicity into four fuzzy variables: low, correct, high, very high (see FIG. 2). The same holds for the output variables.

The inference rules and the definition of the degree of membership in a family define the value to be taken by the output D. The calculation of the control D consists in quantifying the fuzzy output (or outputs) and in transforming it (or them) into a numerical quantity or numerical quantities relevant to the process, see L.A. ZADEH "information and control" 8-1965). Starting from this state of the art the present invention affords a process for regulating, by fuzzy logic, a centrifuge used for solid/liquid separation in particular for the dewatering of sewage sludges which consists in:

(A) measuring in the guise of input variables:
  the suspended matter content (SM) of the centrate;
  the flow rates of sludge (Db) and of reagent, that is to say of polymer (Dp);
  in the case of conventional centrifuges, the value of the torque (CPL) of the motor of the centrifuge;
  and which is characterized in that (B) fuzzy logic rules (R1 . . . Rn) are implemented which guage the operation of the centrifuge, rules associated with zones or regions (Z1 . . . Zn) of the at least two-dimensional space defined by the input variables for:
  a) siting the operating point resulting from the above measurements in operating regions which constitute standard spaces where the actions on the sludge flow rate (Db) and reagent flow rate (Dp) make it possible to bring the operating point of the centrifuge into a space or zone (Zs) regarded as being a stable and optimal operating space of the centrifuge, and,
  b) acting, according to the results of the processing of the inputs on the sludge flow rate (Db) at the inlet of the centrifuge and/or on the reagent flow rate (Dp), by implementing the rules other than those corresponding to the said zone (Zs) so as to bring the point representative of the operation of the centrifuge into the said zone.

Thus, as is understood from reading the definition of the process of the invention set forth hereinabove, in this process the inputs are of two types:

1) the "process" inputs:
  the SM content of the centrate;
  the sludge flow rate Db and,
  the reagent (polymer) flow rate Dp,
2) the inputs peculiar to the centrifuge:
  the value of the torque CPL and,
  the value of the relative speed VR.

Likewise, the outputs are of two types:

1) the "process" controls:
  the variation in the sludge flow rate Db: generally by employing a variable-speed positive displacement pump control and,
  the variation in the flow rate of reagent Dp (polymer) also using for example a variable-speed positive displacement pump.

These controls in variation in flow rate Db and Dp are actuated as a function of the position of the operating point of the centrifuge (characterized by the "process input" values mentioned hereinabove) with respect to operating regions, defined on the basis of expert rules enacted a priori by the person skilled in the art; these operating regions are standard spaces (having n dimensions, as a function of the number of "process inputs" taken into account) in which the actions on the sludge flow rate and reagent flow rate make it possible to bring the operating point of the centrifuge into a space characterized as being a stable and optimal operating space.

2) operational information, in the form of a display of a confidence index representing the deviation between the actual behaviour of the centrifuge and the ideal behaviour as modelled on the basis of the expert rules of the fuzzy controller. A high confidence index confirms that the centrifuge is being operated in a region of stable and optimal operation for the said centrifuge.

The process therefore makes it possible to characterize and to signal any prolonged malfunctioning (such as: sensor fault, lack of polymer, unsuitability of the polymer, change of sludge characteristics, etc). Persistence of low-value confidence indices (the ideal being to maintain the index at 100%), may, as a last resort, induce the person skilled in the art to redefine, with respect to the expert rules, the operating regions of the centrifuge.

Figure 2:
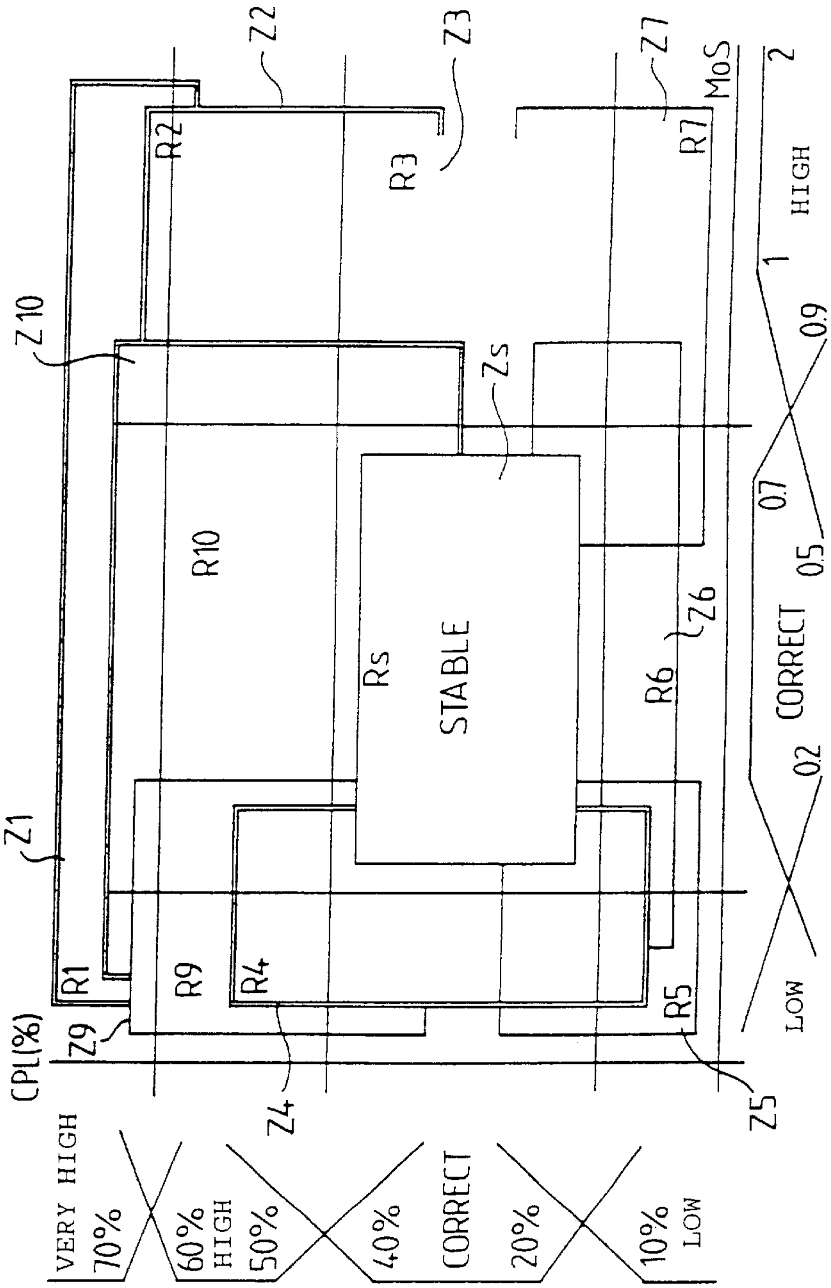

FIG. 2 of the appended drawing shows a representation which takes into account only two of the five input variables of the process according to the present invention (the variation in torque CPL of the centrifuge and the content of suspended matter SM in the centrate) and illustrating the manner of operation of this process insofar as it demonstrates several operating regions or zones and, in particular a region or zone of optimal and stable operation of the centrifuge to which it is applied.

The invention is also aimed at a device for driving a centrifuge used for solid/liquid separation, in particular for the dewatering of sewage station sludges, such as defined in claim 2.

Thus, this device comprises in particular:

means for measuring at least two input variables, namely on the one hand the suspended matter content SM of the centrate and on the other hand the torque CPL of the motor of the centrifuge (in the case of conventional centrifuges), i.e. the relative speed VR of the screw of the centrifuge with respect to the latter's bowl (in the case of intensive centrifuges), means for implementing fuzzy logic rules R1 . . . Rn gauging the operation of the centrifuge, rules associated with zones or regions Z1 . . . Zn of the at least two-dimensional space defined by the input variables and, means for periodically determining, by fuzzy logic, on the basis of rules R1 . . . Rn, new targets for the sludge flow rate Db and for the polymer flow rate Dp supplied to the centrifuge.

According to one characteristic of this device, it comprises means for measuring additional input variables, such as in particular the sludge flow rate Db, the polymer flow rate Dp, the relative speed VR of the screw of the centrifuge with respect to the latter's bowl (in the case of conventional centrifuges) or of the torque CPL of the motor of the centrifuge (in the case of intensive centrifuges).

According to another characteristic of this device, there exists at least one zone Zs belonging to the space Z1 . . . Zn termed the "stable and optimal operating zone" corresponding to a rule Rs according to which the sludge flow rate Db and polymer flow rate Dp are unchanged so long as the point representative of the operation of the centrifuge lies in the said zone Zs.

According to the invention, the rules R1 . . . Rn other than the rules Rs have the objective of bringing the point representative of the operation of the centrifuge into the zones Zs.

According to another characteristic of the invention, the rules R1 . . . Rn are defined a priori, as a function of the type of centrifuge, independently of the site where the centrifuge is set up, whilst the limits of the zones Z1 . . . Zn are defined on-site, as a function of the local conditions, in particular of the type of sludge to be treated.

According to the invention, the rules Ri belonging to the set R1 . . . Rn include an inference of the type:

$$Db\ (t+\delta t)=Db(t)\times(1+Xi)$$

in which Xi is any number which can be adjusted on the site, Db(t) is the flow rate of sludge at the instant t+δt.

According to another characteristic of this device, with each rule R1 . . . Rn is associated a number IC1 . . . Icn, called the Confidence Index, representative of the assessment of the quality of operation of the centrifuge and, a global confidence liquid, representative of the assessment of the quality of operation of the centrifuge at the current operating point, is determined by fuzzy logic and assigned for information of the staff in charge of monitoring the centrifuge.

Among the advantages afforded by the present invention, mention may be made in particular of the following:

Operational Gain.

It will be recalled that all the suspended matter emanating from an installation for dewatering sewage sludges and returning to the head of the sewage station may be regarded as pollution which is added to the incoming pollution and hence generates additional running costs.

Taking as a basis a 50,000 peq (population equivalent) station treating close to 1000 tonnes per year of sludge, an unregulated centrifuge, without human monitoring, may "diverge" 30% of its operating time to a capture rate of as low as 85%. This translates into an overhead on the sewage station which induces high running costs. In such a case, it is estimated that the process according to the invention makes it possible to save, each year, the purchase cost of the plant and the cost of implementing fuzzy regulation, sensors and associated equipment.

Gain on Investment:

The invention makes it possible to guarantee optimal and stable operation with no monitoring, this translating into various advantages from the standpoint of investments to be made in setting up the installation for dewatering sludges by centrifugation. Mention will be made for example of:

- flexibility of dimensioning with respect to the constructors' ranges:
  - the designer no longer being constrained by the need to make the daily running period coincide with the actual time of presence of the operators;
  - it being possible for the centrifuges to operate, with no direct monitoring, for 12, 16 hours a day and even more;
  - the process is perfectly suited to remote monitoring, the operators being informed, in real-time, of any malfunctions.

It will be noted moreover that the process which is the subject of the present invention may be implemented, without costly investment in respect of centrifuges currently available on the market. The invention thus makes it possible to refurbish old plants, allowing reductions in running costs whilst improving the reliability of operation of these plants.

What is claimed is:

1. A process for regulating a centrifuge used for solid/liquid separation of sewage sludge, the process comprising the steps:

measuring the input variables of the operating point of the centrifuge, the variables including;

a) suspended matter content of the centrate;

b) the flow rate of sludge;

c) the flow rate of reagent;

d) the value of torque of the motor of a conventional centrifuge;

establishing operating zones, each of which is two dimensional relative to the input variables;

establishing fuzzy logic rules qualifying the operation of the centrifuge, the rules respectively corresponding to the zones;

implementing rules, in response to the input variable measurements, where actions on the sludge flow rate and reagent flow rate make it possible to bring the operating point into a particular zone of optimal and stable centrifuge operation.

2. A device for regulating a centrifuge used for solid/liquid separation of sewage sludge, the device comprising:

means for measuring suspended matter content of the centrate;

means for measuring the flow rate of sludge;

means for measuring the flow rate of reagent;

means, selectively employed, for measuring the value of torque of a motor of a conventional centrifuge;

means, selectively employed, for measuring the relative speed of an intensive centrifuge screw with respect to a centrifuge bowl;

means for implementing fuzzy logic rules that gauge the operation of the centrifuge, the rules corresponding to operational zones, each of the zones being two dimensional relative to input variables for which all the measuring means are provided;

wherein a particular zone represents a stable and optimal operating zone corresponding to a particular rule according to which the sludge flow and reagent rates remain unchanged so long as a point of centrifuge operation lies in the particular zone;

means for periodically determining, by fuzzy logic, on the basis of the rules, other that the rule corresponding to the particular zone new targets for the sludge flow rate and the reagent flow rate, bringing the point representative of the operation of the centrifuge into the particular zone.

3. A device as set forth in claim 2 wherein the rules are defined a priori, as a function of the type of centrifuge, independently of a centrifuge installation site and the limits of the zones are defined on-site, as a function of a particular type of sludge being treated.

4. A device as set forth in claim 2 wherein the rules comprise an inference of the type $$Db(t+\sigma t)=Db(t)\times(1+Xi)$$

Xi is any number that can be adjusted on the site and Db(t) is the flow rate of sludge as a function of time.

5. A device as set forth in claim 2 wherein each rule is associated with a confidence index, representative of an assessment of the quality of operation of the centrifuge; and wherein a global confidence index, representative of an assessment of the quality of an operation point, is determined by fuzzy logic and provided as information for staff in charge of monitoring the centrifuge.

* * * * *